Aug. 19, 1969 H. DOBERMANN 3,462,552

CONTROL APPARATUS FOR TELEGRAPH EXCHANGE REPEATER

Filed Feb. 7, 1967 2 Sheets-Sheet 1

Aug. 19, 1969 H. DOBERMANN 3,462,552

CONTROL APPARATUS FOR TELEGRAPH EXCHANGE REPEATER

Filed Feb. 7, 1967 2 Sheets-Sheet 2

United States Patent Office 3,462,552

Patented Aug. 19, 1969

3,462,552

CONTROL APPARATUS FOR TELEGRAPH EXCHANGE REPEATER

Hans Dobermann, Munich, Germany, assignor to Siemens Aktiengesellschaft, Munich, Germany Filed Feb. 7, 1967, Ser. No. 614,481
Claims priority, application Germany, Feb. 8, 1966, S 101,900
Int. Cl. H04l 25/20, 25/52, 15/00
U.S. Cl. 178—70 7 Claims

ABSTRACT OF THE DISCLOSURE

A telegraph exchange station repeater wherein the transmitted signals are periodically sampled to effect desired connections, and provide for repeater release. A plurality of count-off relays are successively activated to ensure release of the repeater only a predetermined time period after the telegraph message has been transmitted. Synchronization means are employed, whereby the count-off relays are activated in a predetermined time sequence when a signal is received at the repeater indicating the end of the message or other information being transmitted to release the repeater from the transmitting station and thereby make it available for use by associated exchange substations or distant stations.

Cross-reference to related application

Applicant claims priority from corresponding German application Ser. No. 101,900, filed Feb. 8, 1966.

BACKGROUND OF THE INVENTION

Field of the invention

This invention relates to a repeater, and more particularly, to control means associated with the repeater, to periodically and synchronously sample the signals being translated by the repeater, to release the repeater from a transmitting station upon termination of the message and receipt of an end signal. The repeater has particular applicability for use in long distance communications, and particularly in telegraph dial exchange installations, wherein it is necessary to continually supervise the communications.

Description of the prior art

The prior art teaches the utilization of components of relatively smaller size than those heretofore used, and which operate at fast speeds. For example, solid state components are now in use in telegraph and telephone exchange installations. However, as a result of the utilization of such components, supervision of the signals being translated by the repeater to effect desired connections and release thereof creates problems, which are not solved by the utilization of conventional supervision control circuits.

SUMMARY OF THE INVENTION

These and other objections and defects of prior art systems are overcome by applicant's control apparatus utilized in conjunction with an exchange station repeater, to continually supervise the signals being translated by the repeater. Thus, the signals are periodically sampled to develop control signals to effect the desired connections. The control relays are activated at a predetermined time sequence, only when an end signal is transmitted to the repeater. This ensures that a through connection is maintained when a message is being transmitted which is not terminated until the end signal causes the control relays to effect release of the repeater from the transmitting station.

The invention has particular use in long distance communications, such as in telegraph or telephone exchange installations. Thus, the repeater and associated control circuits can be connected between exchange subscriber substations, and distant exchanges or stations. Synchronization means are utilized, to complete circuits for the control relays, when an end signal is simultaneously received by the repeater, to release the transmitting station from the repeater after a predetermined period of time, and thereby make the repeater available for use by other stations. However, the control relays are not activated when a message is being transmitted by a sending station to the repeater, because the first of the successively activated control relays cannot then be activated for a sufficient period of time to effect release of the repeater.

Detailed description of the invention

Figure 1:
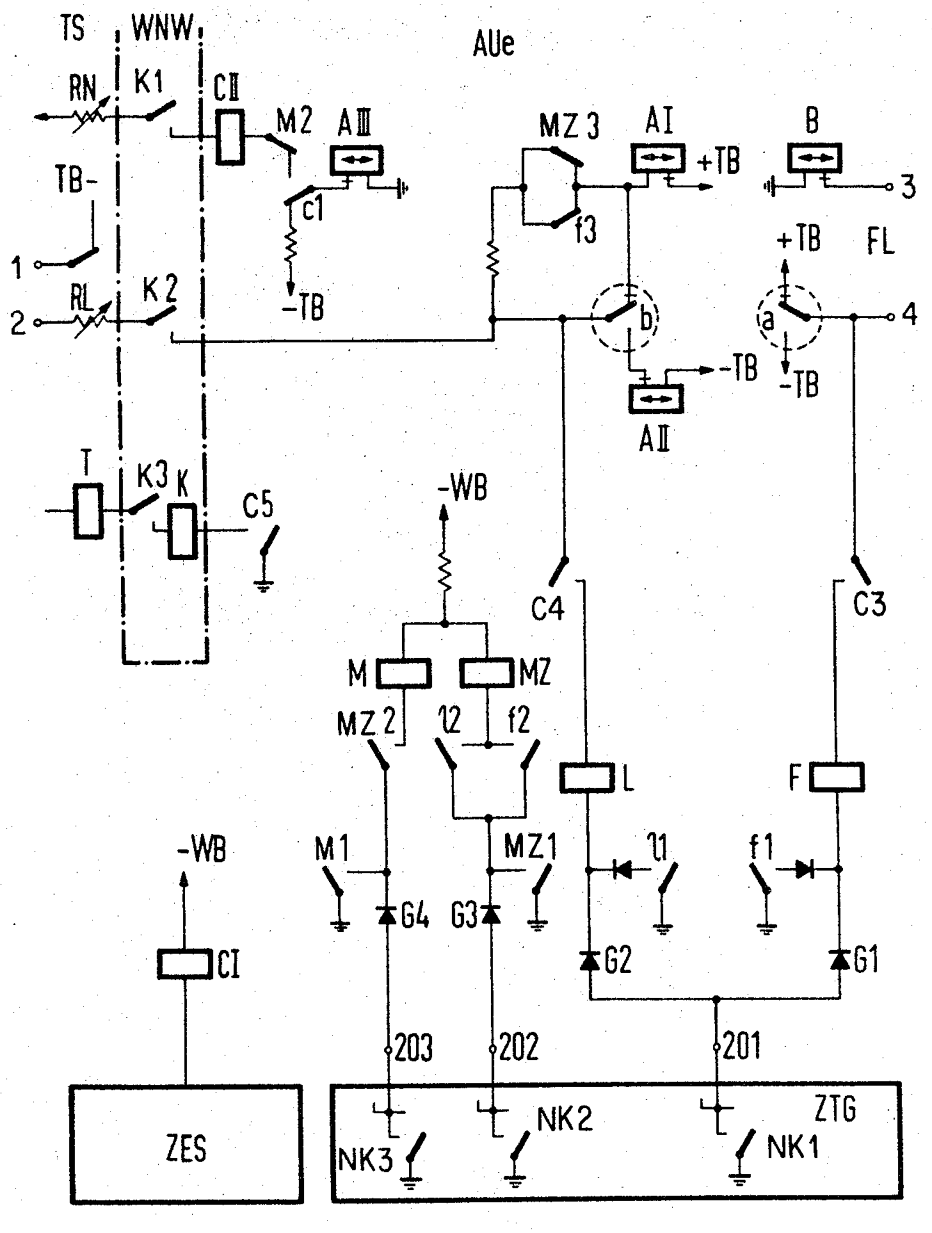
FIGURE 1 is a schematic illustration of the repeater and supervision control circuit utilized, in a central exchange system.

FIGURE 1 shows exchange office repeater AU*e* of a telegraph exchange station, connected over coupling network WNW to exchange station subscriber TS. As illustrated, coupling network WNW comprises a plurality of contacts K1, K2, and K3, which are closed upon energization of relay K. Exchange office repeater AU*e* comprises telegraph relays A and B, and seizure relay C. As indicated, relay C is connected to central control means ZES and is initially energized when seizure of the repeater is directed therefrom. Relays F, L, M, and MZ, are provided to supervise the operation of the repeater and to initiate connection release upon termination of transmitted messages. Thus the exchange office repeater AU*e* is connected to central synchronization device ZTG, through output lines 201, 202, and 203, thereof.

Figure 2:
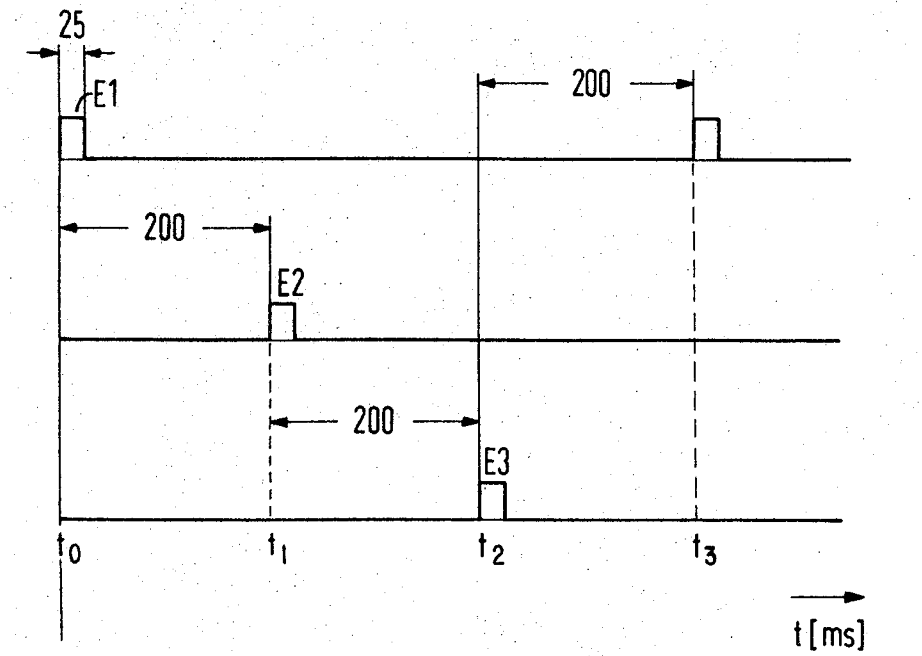
FIGURE 2 is a graph illustrating the time sequence in which the various control relays are periodically actuated as a result of the synchronization pulses.

The central synchronization device ZTG comprises conventional means to generate pulses by which switches NK1, NK2, and NK3, are periodically and successively closed according to the predetermined repeating cycle NK1, NK2, NK3. For example, FIGURE 2 illustrates the time succession of the synchronization pulses produced by central synchronization device ZTG over a period of time. Contacts NK1, NK2, and NK3 may comprise cam contacts, with ground pulses E1, E2, and E3, applied respectively thereto at the spaced time intervals illustrated. Thus, at time T*o*, contact NK1 is closed by impulse E1. At a predetermined time interval of 200 ms. thereafter, contact NK2 is closed by impulse E2; contact NK3 is 200 ms. thereafter by impulse E3. This cycle is repeated. It is understood, however, that other means can also be provided to actuate the relays associated with respective lines 201, 202, and 203; for example, a central synchronization means emitting electrical signals can be utilized to actuate associated relays. Further, the frequency or repetition rate at which NK1, NK2 and NK3 are periodically and successively closed, may be varied according to the conditions desired.

It is thus seen that, depending upon which of switches NK1, NK2 and NK3 are closed, various circuits to ground may be completed, during which time associated supervision relays F, L, MZ, and M may be energized. If an existing through connection is to be released, the end signal identifying the transmission completion may be initiated by either the exchange office subscriber, or by the distant subscriber station. In both instances, the end signal recognition is time dependent, because of the successive actuation of switches NK1, NK2, and NK3.

For example, consider the generation of an end signal by the exchange office subscriber station TS. Relay A is polarized such that generation of the end signal by exchange office subscriber station TS energizes relay A and causes contact arm *a* to be connected to —TB, the permanent start position. Then, when a synchronizing pulse is produced by central synchronization device ZTG thereby closing contact NK1, a completed circuit to ground is effected beween central synchronization means ZTG and —TB via line 201, diode $G_1$, relay F, contact C3, and switch *a*, thereby energizing relay F. Further, this circuit is self-maintaining over contact $f_1$, when contact NK1 opens at the end of impulse E1. Energization of relay F, also closes contact $f_2$.

At time $t_1$, contact NK2 closes, thereby energizing relay MZ, because a completed circuit to ground is effected over line 202 diode $G_3$, contact $f_2$, relay MZ, to —WB. Since MZ is thereby energized, holding contact MZ1 is closed so that relay MZ remains energized upon opening of contact NK2. Further, energization of relay MZ, closes contact MZ2.

Relays F and MZ also comprise additional contacts $f_3$ and MZ3, which are actuated or closed upon energization of their respective relays. Further, contacts $f_3$ and MZ3 are actuated or closed prior to reception by the exchange office of the end signal acknowledgment resulting from reflection of the end signal by the distant counter transmission by the opposite exchange office; that is, at a maximum of 200 ms. after the end signal is transmitted to repeater AU*e*. Thus, upon closure of switches MZ3 and $f_3$, winding AI of relay A is energized, and the end signal acknowledgment does not effect release of the transmission connections since winding AI is then polarized in the stop position.

At time $t_2$, contact NK3 is closed, and a completed connection exists from —WB to ground, through relay M, contact MZ2, diode G4, and line 203, thereby energizing relay M. This closes contact M1, providing a holding connection to ground for relay M, and opens contact M2 and thus CII, the holding circuit for relay C. Therefore, the central exchange subscriber TS is disconnected from repeater AU*e* and assumes the rest position because contact C5 opens, deenergizing relay K and opening contacts K1, K2, K3. Deenergization of relay C opens contact C3, and therefore, causes deenergization of relay F. The subsequent opening of contact $f_2$ deenergizes relay MZ. Deenergization of relay MZ, causes contact MZ2 to open, thereby deenergizing relay M.

If contact *a* is actuated, however, by a telegraph signal rather than an end signal from subscriber TS, it is not maintained in the polarized start position —TB for a time sufficient to cause disconnection or release of subscriber TS from the exchange station. For example, assuming a rate of telegraph message transmission of 50 bd., 8 unit code by subscriber TS, contact *a* will be in the polarized start position (that is, connected to —TB) for a maximum period of time equal to 180 ms. (plus an additional small amount due to contact closure time loss). Under these conditions, relay F will be energized when contact NK1 is synchronously closed, thereby completing the circuit from —TB to ground. However, relay F will be deenergized prior to the next successive synchronizing pulse which effects closure of contact NK2, and which occurs 200 ms. after closure of contact NK1, thereby opening contact $f_2$. Therefore, the sequence of activation of count-off relays such as to effect the release of TS, does not occur.

An end signal may also be generated by a distant subscriber and transmitted to repeater AU*e* over lines FL. Relay B is then energized and polarized in the start position in which contact *b* is connected to —TB, through relay winding AII. This completes the circuit between —TB and ground through contact C4, relay L, diode $G_2$, line 201, and contact NK1. Relay C was of course, activated when the lines were seized by the distant subscriber. Relay L is thus energized and contact $l_2$ is closed; contact $l_1$ is a holding contact to maintain the connection to ground. Further, as heretofore explained, relays M and MZ are successively activated. Relay C is deenergized when relay M is energized thereby connecting relay winding AIII of relay A to —TB, through contact C1. Thus, subscriber station TS is disconnected because relay K is deenergized, and the repeater is free to be seized again upon direction from central control means ZES.

The repeater connections to the exchange office subscriber and the distant subscriber is effected upon initial seizure of the repeater as directed by the central control means ZES. For example, if subscriber TS desires to transmit information to the distant station, central control means ZES will energize relay CI, thereby closing contact C5 and energizing relay K. This will close contacts K1, K2 and K3. Also, relay T will be energized connecting terminal 1 of the subscriber to —TB.

Relay CII is a holding relay for the various C contacts, and is energized upon activation of contacts CI and K, through the circuit completed through variable resistor RN, contact K1, relay CII, contact M2, contact CI, relay winding AIII to ground. Thereupon, information transmitted by the exchange subscriber TS is translated between —TB and the circuit connected between terminals of the subscriber, that is, variable resistor RL, contact K2, contact *b*, relay winding AI, to +TB, assuming that contact *b* is in the position illustrated in FIGURE 1 upon the prior release of the repeater. The making and breaking of the circuit described, variably energizes relays AI and AII causing contact *a* to be actuated accordingly. The information is then transmitted over communication lines 3, 4 to the distant subscriber. Transmission of an end signal by the exchange subscriber TS functions to effect release of the repeater therefrom by connecting contact *a* to —TB and effecting the proper disconnect operation of supervision relays F, L, MZ and M.

The circuit in which winding AIII is located functions as a simulation circuit of repeater AU*e*. The single-double current conversion of information (for example, the dial signals) emitted prior to successful dialing and the final recontrolling of contact *b* to the stop position takes place through the coaction of windings AIII and AII, whereas that of the information transmitted afterwards (for example, message signals) takes place through the coaction of windings AIII and AI. The circuit shown in the drawing refers to the latter case. Thus one proceeds from the assumption that the connection is switched through and that, accordingly, contact *b* is in the position shown. The conversion of single current signals takes place in this case though the polarized start energization of relay A that is always provided over the third winding thereof ,(RN, K1, CH, *m*2 *cl*, AIII, ground). This energization however is cancelled through actuation of the transmission contact (not shown), at the subscriber by a thereby caused polarized stop energization of winding AI. The telegraph transmission contact is thereby controlled in the rhythm of the single current signals and thus double current signals are applied to line FL.

If information is transmitted by the distant subscriber following seizure of the repeater thereby, relay B will be energized, and cause actuation of contact *b* accordingly. This will cause contact *b* to make and break contact with +TB through relay AI, and —TB through relay AII, depending upon the information being transmitted. Thus, the circuit will be completed and information will be transmitted to the local subscriber TS through switch K2, load resistance RL, and the subscriber station to —TB As explained heretofore, this connection is broken when an end singal is transmitted by the distant subscriber to the repeater, causing contact *b* to be connected to —TB for the predetermined period of time and thus upon the synchronous closure of switches NK1–NK3, causing sequential activation of relays L, $MZ_1$, and M, to effect disconnection of the distant subscriber from the repeater.

It is understood, of course, that the described control functions can be effected in any time succession desired, by varying the activation of contacts $NK_1$, $NK_2$ and $NK_3$ and, further by varying the number of such count-off relays. The control circuits described according to the invention when used in telegraph dial exchange installations permits not only transmission completion supervision, but also time evaluations for other purposes; for example: supervision of long distance lines control impulses, supervision of the protection time following a connection release, and evaluation of a collision between oppositely directed signals.

What is claimed is:

1. An exchange office repeater connective between an exchange office subscriber and a distant station for transmitting information therebetween, which comprises:

a plurality of switching means (F, L, MZ, M), a source of synchronizing signals (ZTG) to successively effect energization of the plurality of switching means in a predetermined time sequence when an end signal identifying completion of information transmission is received by the repeater (AU*e*), release means (K) connected between the exchange office subscriber (TS) and the repeater actuated when the plurality of switches are energized in said predetermined time sequence to disconnect the repeater from the exchange office subscriber.

2. An exchange office repeater as recited in claim 1 wherein the plurality of switching means comprises a plurality of relays.

3. An exchange office repeater as recited in claim 2 wherein the source of synchronizing signals comprises a plurality of output lines (201, 202, 203) successively and cyclically connective to the plurality of relays in response to the synchronizing signals, to complete electrical circuits to energize the relays (F, L, M, MZ).

4. An exchange office repeater as recited in claim 3 wherein the repeater further comprises telegraph relays (AI, AII, AIII, B) having associated contacts (*a*, *b*) for transmission of telegraph information between the exchange office subscriber and a distant station at a rate such that the predetermined time interval is greater than the time interval in which bits of information are transmitted.

5. An exchange office repeater as recited in claim 4 wherein the plurality of relays (F, M, MZ, M) comprise connections, means ($f_3$, $mz_3$) whereby energization of the plurality of relays (F, M, MZ, M) actuates the telegraph relay contacs (*a*, *b*) to positions such that disconnection of the repeater is not effected by reflection of the end signal by the distant station, prior to completion of the predetermined time sequence.

6. An exchange office repeater as recited in claim 3 wherein the plurality of relays (F, L, MZ, M) comprise holding windings having associated contacts ($f_1$, $l_1$, $mz_1$, $m_1$) to maintain completion of the electrical circuits when the associated synchronizing signals are disconnected from the plurality of relays in the predetermined time sequence.

7. An exchange office repeater as described in claim 1 which further comprises:

a central control device (ZES) to seize the repeater and connect it between the exchange office subscriber (TS) and the distant station after the release means (K) disconnect the repeater therefrom, to selectively effect information transmission therebetween.

References Cited

UNITED STATES PATENTS

| | | |
|---|---|---|
| 1,916,239 | 7/1933 | Vernam. |
| 2,640,873 | 6/1053 | Moebius. |
| 2,649,497 | 8/1953 | Munck. |
| 3,113,176 | 12/1963 | Doktor et al. |

THOMAS A. ROBINSON, Primary Examiner

M. M. CURTIS, Assistant Examiner

U.S. Cl. X.R.

178—2, 4.1